(12) United States Patent
Ueda et al.

(10) Patent No.: US 8,400,586 B2
(45) Date of Patent: Mar. 19, 2013

(54) POLARIZING PLATE, AND IMAGE DISPLAY DEVICE HAVING POLARIZING PLATE

(75) Inventors: Narifumi Ueda, Ibaraki (JP); Tatsuya Yamasaki, Ibaraki (JP); Michihito Ooishi, Ibaraki (JP); Satoshi Itou, Ibaraki (JP); Masayuki Satake, Ibaraki (JP)

(73) Assignees: Nitto Denko Corporation, Ibaraki-shi, Osaka (JP); Nippon Shokubai Co., Ltd., Osaka-shi (JP)

( * ) Notice: Subject to any disclaimer, the term of this patent is extended or adjusted under 35 U.S.C. 154(b) by 264 days.

(21) Appl. No.: 12/811,781

(22) PCT Filed: Jan. 13, 2009

(86) PCT No.: PCT/JP2009/050289
§ 371 (c)(1),
(2), (4) Date: Jul. 6, 2010

(87) PCT Pub. No.: WO2009/090932
PCT Pub. Date: Jul. 23, 2009

(65) Prior Publication Data
US 2010/0283946 A1 Nov. 11, 2010

(30) Foreign Application Priority Data
Jan. 17, 2008 (JP) ................................. 2008-008264

(51) Int. Cl.
*G02F 1/1335* (2006.01)
(52) U.S. Cl. ........................................................ 349/96
(58) Field of Classification Search .......................... None
See application file for complete search history.

(56) References Cited

U.S. PATENT DOCUMENTS

| 6,068,794 | A | 5/2000 | Kobayashi et al. |
| 7,252,733 | B2 | 8/2007 | Wang et al. |
| 7,399,376 | B2 | 7/2008 | Wang et al. |
| 7,675,587 | B2 | 3/2010 | Sugiyama et al. |
| 2005/0249932 | A1 | 11/2005 | Wang et al. |
| 2005/0249944 | A1 | 11/2005 | Wang et al. |
| 2006/0027322 | A1 | 2/2006 | Sugiyama et al. |
| 2009/0186170 | A1 | 7/2009 | Yamamoto et al. |
| 2011/0261298 | A1* | 10/2011 | Yoshihara et al. .............. 349/96 |

FOREIGN PATENT DOCUMENTS

| JP | 9-203810 A | 8/1997 |
| JP | 2006-201736 A | 8/2006 |
| JP | 2007-127893 A | 5/2007 |

(Continued)

OTHER PUBLICATIONS

International Search Report of PCT/JP2009/050289, Mailing Date of Apr. 7, 2009.

(Continued)

*Primary Examiner* — Sung Pak
(74) *Attorney, Agent, or Firm* — Westerman, Hattori, Daniels & Adrian, LLP

(57) ABSTRACT

The present invention provides a polarizing plate excellent in adherence (particularly, under high-temperature and high-humidity conditions) between a polarizer and a protective film. The polarizing plate of the present invention includes: a polarizer; an adhesive layer; an easy-adhesion layer formed of an easy-adhesive composition containing a urethane resin having a carboxyl group and a cross-linking agent; and a protective film containing a (meth)acrylic resin.

7 Claims, 1 Drawing Sheet

FOREIGN PATENT DOCUMENTS

| | | |
|---|---|---|
| JP | 2007-328328 A | 12/2007 |
| JP | 2007-333946 A | 12/2007 |
| JP | 2007-536568 A | 12/2007 |
| JP | 2008-009329 A | 1/2008 |
| JP | 2008-181113 A | 8/2008 |
| JP | 2008-281838 A | 11/2008 |

OTHER PUBLICATIONS

Chinese Office Action dated Oct. 10, 2012, issued in corresponding Chinese Patent Application No. 200980102169.5, (16 pages). With English Translation.

* cited by examiner

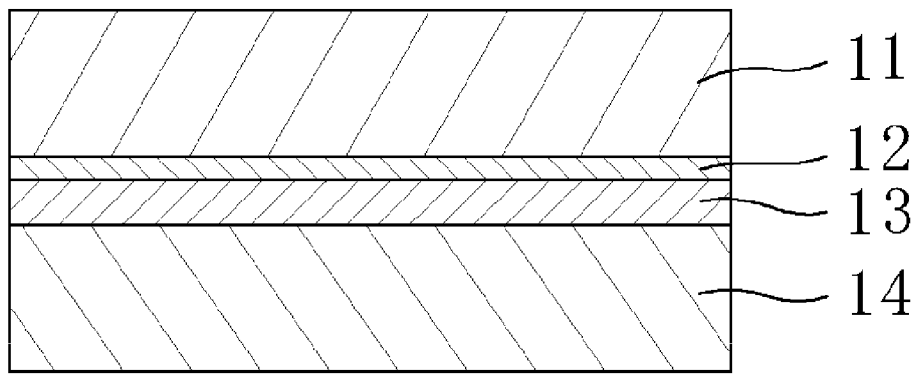

POLARIZING PLATE, AND IMAGE DISPLAY DEVICE HAVING POLARIZING PLATE

TECHNICAL FIELD

The present invention relates to a polarizing plate and an image display device using the polarizing plate. More specifically, the present invention relates to a polarizing plate excellent in adherence between a polarizer and a protective film.

BACKGROUND ART

In a liquid crystal display device as a typical image display device, owing to an image forming system of the device, it is indispensable to place polarizing plates on both sides of a liquid crystal cell. The polarizing plate usually has a configuration in which protective films are attached to both surfaces of a polarizer with an adhesive. As a material for forming the protective film, there is proposed an acrylic resin. Further, in order to enhance adhesion property between the polarizer and the protective film, it is proposed to provide an easy-adhesion layer between the polarizer and the protective film, and to subject the protective film to easy-adhesion treatment such as corona discharge treatment (for example, Patent Document 1). However, there is a problem in that the adherence between the polarizer and the protective film (particularly, under high-temperature and high-humidity conditions) is not sufficient.

PRIOR ART DOCUMENT

Patent Document 1: JP 2007-127893 A

DISCLOSURE OF THE INVENTION

Problems to be Solved by the Invention

The present invention has been made in view of solving the above-mentioned conventional problem, and a main object of the present invention is to provide a polarizing plate excellent in adherence (particularly, under high-temperature and high-humidity conditions) between a polarizer and a protective film.

Means for Solving the Problems

According to one aspect of the present invention, a polarizing plate is provided. The polarizing plate includes: a polarizer; an adhesive layer; an easy-adhesion layer formed of an easy-adhesive composition containing a urethane resin having a carboxyl group and a cross-linking agent; and a protective film containing a (meth)acrylic resin.

In one embodiment of the invention, the adhesive layer is formed of an adhesive composition containing a polyvinyl alcohol resin having an acetoacetyl group.

In another embodiment of the invention, the easy-adhesion layer is obtained by subjecting the easy-adhesive composition to drying at 90° C. or more.

In still another embodiment of the invention, the protective film is subjected to corona discharge treatment or plasma treatment on a side on which the polarizer is placed.

In still another embodiment of the invention, the cross-linking agent includes an acrylic polymer having an oxazoline group.

According to another aspect of the present invention, an image display device is provided. The image display device includes the polarizing plate.

According to still another aspect of the present invention, a liquid crystal display device is provided. The liquid crystal display device includes a liquid crystal cell and the polarizing plate placed on at least one side of the liquid crystal cell.

Effects of the Invention

According to the present invention, there may be provided the polarizing plate, which is excellent in adherence (particularly, under high-temperature and high-humidity conditions) between the polarizer and the protective film by forming the easy-adhesion layer of the easy-adhesive composition containing the urethane resin having the carboxyl group and the cross-linking agent. Such finding was first obtained by actually subjecting the polarizing plate having the easy-adhesion layer formed of the easy-adhesive composition containing the urethane resin having the carboxyl group and the cross-linking agent to high-temperature and high-humidity conditions, which being an unexpected excellent effect.

BRIEF DESCRIPTION OF THE DRAWINGS

FIG. 1 is a schematic cross-sectional view illustrating a polarizing plate according to a preferred embodiment of the present invention.

BEST MODE FOR CARRYING OUT THE INVENTION

Hereinafter, description is made of preferred embodiments of the present invention, but the present invention is not limited to these embodiments.

A. Entire Configuration of Polarizing Plate

FIG. 1 is a schematic cross-sectional view of a polarizing plate according to a preferred embodiment of the present invention. A polarizing plate 10 includes a polarizer 11, an adhesive layer 12, an easy-adhesion layer 13, and a protective film 14 in this order. Although not shown, practically, the polarizing plate 10 has a second protective film attached to a side of the polarizer 11 opposite to the protective film 14 via an adhesive layer.

A-1. Polarizer

Any suitable polarizer may be adopted as the above-mentioned polarizer 11 in accordance with a purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferable because of high polarized dichromaticity. A thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times the length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washes away an antiblocking agent, but also provides an effect of preventing nonuniformity such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide or in a water bath.

A-2. Adhesive Layer

As an adhesive forming the adhesive layer 12, any suitable adhesive may be adopted. Preferably, the adhesive layer 12 is formed of an adhesive composition containing a polyvinyl alcohol-based resin.

Examples of the polyvinyl alcohol-based resin include a polyvinyl alcohol resin and a polyvinyl alcohol resin containing an acetoacetyl group. Preferably, the polyvinyl alcohol-based resin is a polyvinyl alcohol resin containing an acetoacetyl group. This is because the adherence between the polarizer and the protective film may be further enhanced to thereby enhance the durability.

Examples of the above-mentioned polyvinyl alcohol-based resin include: a saponified polyvinyl acetate and derivatives of the saponified product; a saponified product of a copolymer obtained by copolymerizing vinyl acetate with a monomer having copolymerizability; and a modified polyvinyl alcohol obtained by modifying polyvinyl alcohol to acetal, urethane, ether, graft, or phosphate. Examples of the monomer include unsaturated carboxylic acids such as maleic acid (anhydrides), fumaric acid, crotonic acid, itaconic acid, and (meth)acrylic acid and esters thereof; α-olefin such as ethylene and propylene; (sodium) (meth)allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. Those resins may be used alone or in combination.

The polyvinyl alcohol-based resin has an average degree of polymerization of preferably about 100 to 5,000, and more preferably 1,000 to 4,000, from a viewpoint of adhesion property. The polyvinyl alcohol-based resin has an average degree of saponification of preferably about 85 to 100 mol %, and more preferably 90 to 100 mol %, from a viewpoint of adhesion property.

The above polyvinyl alcohol-based resin containing an acetoacetyl group is obtained, for example, by reacting a polyvinyl alcohol-based resin with diketene by any method. Specific examples thereof include a method of adding diketene to a dispersion in which a polyvinyl alcohol-based resin is dispersed in a solvent such as acetic acid, a method of adding diketene to a solution in which a polyvinyl alcohol-based resin is dissolved in a solvent such as dimethylformamide or dioxane, and a method of bringing diketene gas or liquid diketene into direct contact with a polyvinyl alcohol-based resin.

The acetoacetyl group modification degree of the above polyvinyl alcohol-based resin containing an acetoacetyl group is typically 0.1 mol % or more, preferably about 0.1 to 40 mol %, more preferably 1 to 20 mol %, and particularly preferably 2 to 7 mol %. When the modification degree is less than 0.1 mol %, water resistance may be insufficient. When the modification degree exceeds 40 mol %, the effect of the enhancement of water resistance is small. The acetoacetyl group modification degree is a value measured by NMR.

The adhesive composition may contain a cross-linking agent. As the cross-linking agent, any suitable cross-linking agent may be adopted. Preferably, a compound having at least two functional groups each having reactivity with a polyvinyl alcohol-based resin can be used as a cross-linking agent. Examples of the compound include: alkylene diamines having an alkylene group and two amino groups such as ethylene diamine, triethylene diamine, and hexamethylene diamine; isocyanates such as tolylene diisocyanate, hydrogenated tolylene diisocyanate, trimethylene propane tolylene diisocyanate adduct, triphenylmethane triisocyanate, methylene bis (4-phenylmethane)triisocyanate, isophorone diisocyanate, and ketoxime blocked compounds thereof or phenol blocked compounds thereof; epoxides such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino-formaldehyde resin such as a condensate of formaldehyde with methylolurea, methylolmelamine, alkylated methylolurea, alkylated methylol melamine, acetoguanamine, or benzoguanamine; and salts of sodium, potassium divalent metals or trivalent metals such as magnesium, calcium, aluminum, iron, and nickel and oxides thereof. Of those, an amino-formaldehyde resin and dialdehydes are preferred. As the amino-formaldehyde resin, a compound having a methylol group is preferred, and as the dialdehydes, glyoxal is preferred. Of those, a compound having a methylol group is preferred, and methylol melamine is particularly preferred.

The blending amount of the above cross-linking agent may be appropriately set depending upon the kind of the above polyvinyl alcohol-based resin and the like. Typically, the blending amount of the above cross-linking agent is about 10 to 60 parts by weight, and preferably 20 to 50 parts by weight based on 100 parts by weight of the polyvinyl alcohol-based resin. This is because the cross-linking agent in such a blending amount is excellent in adhesion property. In the case where the blending amount of the cross-linking agent is large, the reaction of the cross-linking agent proceeds in a short period of time, and an adhesive tends to be gelled. Consequently, the usable time (pot life) of the adhesive becomes extremely short, which may make it difficult to use the adhesive industrially.

The adhesive composition may contain a metal compound colloid. The metal compound colloid may have a configuration in which metal compound fine particles are dispersed in a disperse medium, and may be electrostatistically stabilized due to the interaction between the same kind of charges of the fine particles and have stability perpetually. Owing to inclusion of such metal compound colloid, for example, there may be obtained an adhesive composition excellent in stability even in the case where the compounding amount of the cross-linking agent is large.

The average particle diameter of the fine particles forming a metal compound colloid may be any suitable value as long as the optical properties such as polarization properties are not adversely influenced. The average particle diameter is preferably 1 to 100 nm, and more preferably 1 to 50 nm. This is because the fine particles may be dispersed uniformly in an adhesive layer to keep adhesion property, and the occurrence of knick defects may be suppressed. The "knick defects" refer to light leakage.

As the above metal compound, any suitable compound may be adopted. Examples of the metal compound include a metal oxide such as alumina, silica, zirconia, or titania; a metal salt such as aluminum silicate, calcium carbonate, magnesium silicate, zinc carbonate, barium carbonate, or calcium phosphate; and a mineral such as cerite, talc, clay, or kaolin. As described later, according to the present invention, a metal compound colloid having a positive charge is used preferably. Examples of the metal compound include alumina and titania, and alumina is particularly preferred.

The metal compound colloid is typically present in a state of a colloid solution in which the metal compound colloid is dispersed in a dispersion medium. Examples of the dispersion medium include water and alcohols. The concentration of a solid content in a colloid solution is typically about 1 to 50% by weight, and preferably 1 to 30% by weight. The colloid solution may contain acids such as nitric acid, hydrochloric acid, and acetic acid as a stabilizer.

The blending amount of the above metal compound colloid (solid content) is preferably 200 parts by weight or less, more preferably 10 to 200 parts by weight, much more preferably 20 to 175 parts by weight, and most preferably 30 to 150 parts by weight based on 100 parts by weight of the polyvinyl alcohol-based resin. This is because such a blending amount may suppress the occurrence of knick defects while keeping adhesion property.

The adhesive composition of the embodiment of the present invention may contain: a coupling agent such as a silane coupling agent and a titanium coupling agent; various kinds of tackifiers; a UV absorber; an antioxidant; and stabilizers such as a heat-resistant stabilizer and a hydrolysis-resistant stabilizer.

The form of the adhesive composition is preferably an aqueous solution (resin solution). The resin concentration is preferably 0.1 to 15% by weight, and more preferably 0.5 to 10% by weight in terms of applicability, shelf stability, and the like. The viscosity of the resin solution is preferably 1 to 50 mPa·s. In the case where the metal compound colloid is included, the occurrence of knick defects may be effectively suppressed even in the range of a low viscosity of 1 to 20 mPa·s. The pH of the resin solution is preferably 2 to 6, more preferably 2.5 to 5, still more preferably 3 to 5, and most preferably 3.5 to 4.5. Usually, the surface charge of the metal compound colloid may be controlled by adjusting the pH. The surface charge is preferably a positive charge. The presence of a positive charge may further suppress the occurrence of knick defects. Note that, the surface charge may be checked, for example, by measuring the zeta potential with a zeta potential measurement device.

As a method of preparing the resin solution, any suitable method may be adopted. In the case where the resin solution contains the cross-linking agent and the metal compound colloid, for example, a method of mixing a polyvinyl alcohol-based resin with a cross-linking agent previously and adjusting the mixture to an appropriate concentration, and blending a metal compound colloid with the mixture thus obtained may be adopted. Alternatively, after mixing a polyvinyl alcohol-based resin with a metal compound colloid, a cross-linking agent may be mixed with the mixture while considering a use period and the like. The concentration of the resin solution may be adjusted after the resin solution is prepared.

The thickness of the adhesive layer formed of the adhesive composition may be set at any suitable value depending upon, for example, the composition of the adhesive composition. The thickness is preferably 10 to 300 nm, more preferably 10 to 200 nm, and particularly preferably 20 to 150 nm. This is because sufficient adhesive strength may be obtained.

A-3. Easy-Adhesion Layer

The easy-adhesion layer 13 is formed of an easy-adhesive composition containing a urethane resin having a carboxyl group and a cross-linking agent. A polarizing plate excellent in adherence (particularly, under high-temperature and high-humidity conditions) between the polarizer and the protective film may be obtained by forming the easy-adhesion layer of such easy-adhesive composition. Further, an easy-adhesion layer excellent in adherence to a protective film may be obtained by using a urethane resin. The easy-adhesive composition is preferably a water-based composition. The water-based composition may be excellent in an environment aspect and workability, compared with a solvent-based composition.

The urethane resin is typically obtained by reacting polyol with polyisocyanate. The polyol is not particularly limited as long as it has two or more hydroxyl groups in a molecule, and any suitable polyol may be adopted. Examples of the polyol include polyacrylic polyol, polyester polyol, and polyether polyol. These polyols may be used alone or in combination.

The polyacrylic polyol is typically obtained by copolymerizing a (meth)acrylic acid ester and a monomer having a hydroxyl group. Examples of the (meth)acrylic acid esters include methyl (meth)acrylate, butyl (meth)acrylate, 2-ethylhexyl (meth)acrylate, and cyclohexyl (meth)acrylate. Examples of the monomer having a hydroxyl group include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 2-hydroxypentyl (meth)acrylate; (meth)acrylic acid monoesters of polyalcohols such as glycerine and trimethylolpropane; and N-methylol (meth)acrylamide. They may be used alone or in combination.

In addition to the above-mentioned monomer components, other monomers may be copolymerized to the polyacrylic polyol. Any suitable monomer may be adopted as the above-mentioned other monomers as long as they are copolymerizable. Specific examples include unsaturated monocarboxylic acids such as (meth)acrylic acid; unsaturated dicarboxylic acids such as maleic acid, and anhydrides and mono- or di-esters thereof; unsaturated nitriles such as (meth)acrylonitrile; unsaturated amides such as (meth)acrylamide and N-methylol (meth)acrylamide; vinyl esters such as vinyl acetate and vinyl propionate; vinyl ethers such as methyl vinyl ether; α-olefins such as ethylene and propylene; halogenated α,β-unsaturated aliphatic monomers such as vinyl chloride and vinylidene chloride; and α,β-unsaturated aromatic monomers such as styrene and α-methylstyrene. They may be used alone or in combination.

The polyester polyol is typically obtained by reacting a polybasic acid component with a polyol component. Examples of the polybasic acid component include aromatic dicarboxylic acids such as orthophthalic acid, isophthalic acid, telephthalic acid, 1,4-naphthalene dicarboxylic acid, 2,5-naphthalene dicarboxylic acid, 2,6-naphthalene dicarboxylic acid, biphenyl dicarboxylic acid, and tetrahydrophthalic acid; aliphatic dicarboxylic acids such as oxalic acid, succinic acid, malonic acid, glutaric acid, adipic acid, pimelic acid, suberic acid, azelaic acid, sebacic acid, decane dicarboxylic acid, dodecane dicarboxylic acid, octadecane dicarboxylic acid, tartaric acid, alkyl succinic acid, linoleic acid, maleic acid, fumaric acid, mesaconic acid, citraconic acid, and itaconic acid; alicyclic dicarboxylic acids such as hexahydrophthalic acid, tetrahydrophthalic acid, 1,3-cyclohexane dicarboxylic acid, and 1,4-cyclohexane dicarboxylic acid; or reactive derivatives such as acid anhydrides, alkyl esters, or acid halides thereof. They may be used alone or in combination.

Examples of the polyol component include ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 1-methyl-1,3-butylene glycol, 2-methyl-1,3-butylene glycol, 1-methyl-1,4-pentylene glycol, 2-methyl-1,4-pentylene glycol, 1,2-dimethyl-neopentyl glycol, 2,3-dimethyl-neopentyl glycol, 1-methyl-1,5-pentylene glycol, 2-methyl-1,5-pentylene glycol, 3-methyl-1,5-pentylene glycol, 1,2-dimethylbutylene glycol, 1,3-dimethylbutylene glycol, 2,3-dimethylbutylene glycol, 1,4-dimethylbutylene glycol, diethylene glycol, triethylene glycol, polyethylene glycol, dipropylene glycol, polypropylene glycol, 1,4-cyclohexane dimethanol, 1,4-cyclohexanediol, bisphenol A, bisphenol F, hydrogenated bisphenol A, and hydrogenated bisphenol F. They may be used alone or in combination.

The polyether polyol is typically obtained by ring-opening addition polymerization in an alkylene oxide to a polyalcohol. Examples of the polyalcohol include ethylene glycol, diethylene glycol, propylene glycol, dipropylene glycol, glycerine, and trimethylolpropane. Examples of the alkylene oxide include ethylene oxide, propylene oxide, butylene oxide, styrene oxide, and tetrahydrofuran. They may be used alone or in combination.

Examples of the polyisocyanate include aliphatic diisocyanates such as tetramethylene diisocyanate, dodecamethylene diisocyanate, 1,4-butane diisocyanate, hexamethylene diisocyanate, 2,2,4-trimethylhexamethylene diisocyanate, 2,4,4-trimethylhexamethylene diisocyanate, lysine diisocyanate, 2-methylepentane-1,5-diisocyanate, and 3-methylepentane-1,5-diisocyanate; alicyclic diisocyanates such as isophorone diisocyanate, hydrogenated xylylene diisocyanate, 4,4'-cyclohexylmethane diisocyanate, 1,4-cyclohexanediisocyanate, methylcyclohexylene diisocyanate, and 1,3-bis(isocyanatomethyl) cyclohexane; aromatic diisocyanates such as tolylene diisocyanate, 2,2'-diphenylmethane diisocyanate, 2,4'-diphenylmethane diisocyanate, 4,4'-diphenylmethane diisocyanate, 4,4'-diphenyldimethylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate; and aromatic aliphatic diisocyanates such as dialkyldiphenylmethane diisocyanate, tetraalkyldiphenylmethane diisocyanate, and α,α,α,α-tetramethylxylylene diisocyanate. They may be used alone or in combination.

The urethane resin has a carboxyl group. Due to the presence of the carboxyl group, a polarizing plate excellent in adherence (particularly, under a high temperature condition) between the polarizer and the protective film may be provided. The urethane resin having a carboxyl group may be obtained, for example, by reacting a chain extender having a free carboxyl group in addition to the polyol and the polyisocyanate. Examples of the chain extender having a free carboxyl group include dihydroxycarboxylic acids, and dihydroxysuccinic acid. Examples of the dihydroxycarboxylic acids include dialkylolalkanoic acids such as dimethylolalkanoic acid (e.g., dimethylolacetic acid, dimethylolbutanoic acid, dimethylolpropionic acid, dimethylolbutyric acid, dimethylolpentanoic acid). They may be used alone or in combination.

In the production of the urethane resin, in addition to the above-mentioned components, other polyols and other chain extenders may be reacted. Examples of the other polyols include polyols having 3 or more hydroxyl group such as sorbitol, 1,2,3,6-hexanetetraol, 1,4-sorbitan, 1,2,4-butanetriol, 1,2,5-pentanetriol, glycerine, trimethylolethane, trimethylolpropane, and pentaerithritol. Examples of the other chain extenders include glycols such as ethylene glycol, diethylene glycol, triethylene glycol, 1,3-propanediol, 1,3-butanediol, 1,4-butanediol, neopentyl glycol, pentanediol, 1,6-hexanediol, and propylene glycol; aliphatic diamines such as ethylene diamine, propylene diamine, hexamethylene diamine, 1,4-butane diamine, and aminoethylethanol amine; alicyclic diamines such as isophorone diamine and 4,4'-dicyclohexylmethane diamine; and aromatic diamines such as xylylene diamine and tolylene diamine.

As a method of producing the urethane resin, any suitable method may be adopted. Specific examples thereof include a one-shot method of reacting each of the above-mentioned components at a time and a multistage method of reacting the components in stages. In the case where the urethane resin has a carboxyl group, the multistage method is preferably used. This is because the carboxyl group may be introduced easily. Note that, in the production of the urethane resin, any suitable urethane reaction catalyst may be used.

In the case where the easy-adhesive composition is water-based, a neutralizer is preferably used in the production of the urethane resin. Improvement in stability of the urethane resin in water is obtainable by using a neutralizer. Examples of the neutralizer include ammonia, N-methylmorpholine, triethylamine, dimethylethanolamine, methyldiethanolamine, triethanolamine, morpholine, tripropylamine, ethanolamine, triisopropanolamine, and 2-amino-2-methyl-1-propanol. They may be used alone or in combination.

In the case where the easy-adhesive composition is water-based, at the time of the production of the urethane resin, an organic solvent which is inert with respect to the polyisocyanate and which is compatible with water is preferably used. Examples of the organic solvent include ester-based solvents such as ethyl acetate, butyl acetate, and ethyl cellosolve acetate; ketone-based solvents such as acetone, methyl ethyl ketone, and methyl isobutyl ketone; and ether-based solvents such as dioxane, tetrahydrofuran, and propylene glycol monomethyl ether. They may be used alone or in combination.

The number average molecular weight of the urethane resin is preferably 5000 to 600,000 and more preferably 10,000 to 400,000. The acid value of the urethane resin is preferably 10 or more, more preferably 10 to 50, and particularly preferably 20 to 45. When the acid value is in such range, the adherence between the polarizer and the protective film may be more excellent.

As the cross-linking agent, any suitable cross-linking agent capable of reacting with a carboxyl group may be adopted. A preferred example includes a polymer having a group capable of reacting with a carboxyl group. Examples of the group capable of reacting with a carboxyl group include an organic amino group, an oxazoline group, an epoxy group, and a carbodiimide group. Preferably, the cross-linking agent has an oxazoline group. Of those, the cross-linking agent having an oxazoline group has a long pot life at room temperature when mixed with the urethane resin and proceeds with a cross-linking reaction when heated, and hence, has satisfactory workability.

As the polymer, any suitable polymer may be adopted. Examples of the polymer include an acrylic polymer and a styrene acrylic polymer. The polymer is preferably an acrylic polymer. With the use of the acrylic polymer, the adherence between the polarizer and the protective film may be further enhanced. Further, the acrylic polymer may be stably compatibilized with a water-based easy-adhesive composition, and may be cross-linked with the urethane resin satisfactorily.

The easy-adhesive composition may further contain any suitable additive. Examples of the additive include an antiblocking agent, a dispersion stabilizer, a thixotropic agent, an antioxidant, a UV-absorbing agent, an antifoaming agent, a thickener, a dispersant, a surfactant, a catalyst, a filler, a lubricant, and an antistatic agent.

As described above, the easy-adhesive composition is preferably a water-based composition. The concentration of the urethane resin in the easy-adhesive composition is preferably 20 to 50% by weight and more preferably 25 to 45% by weight. This is because the workability during formation of the easy-adhesion layer may be excellent. The content of the cross-linking agent in the easy-adhesive composition is preferably 1 to 30 parts by weight and more preferably 3 to 20 parts by weight based on 100 parts by weight of the urethane resin. By setting the content at 1 part by weight or more, the adherence between the polarizer and the protective film may be excellent. On the other hand, by setting the content at 30 parts by weight or less, a retardation may be prevented from being expressed in the easy-adhesion layer. Note that a method of forming the easy-adhesion layer is described in the section B.

The thickness of the easy-adhesion layer may be set at any suitable value. The thickness is preferably 0.1 to 10 µm, more preferably 0.1 to 5 µm, and particularly preferably 0.2 to 1.5 µm. By setting the thickness in such range, the adherence between the polarizer and the protective film may be excellent and a retardation may be prevented from being expressed in the easy-adhesion layer.

A-4. Protective Film

The protective film 14 contains a (meth)acrylic resin. The protective film is obtained, for example, by subjecting a forming material containing a resin component containing a (meth)acrylic resin as a main component to extrusion.

The glass transition temperature (Tg) of the (meth)acrylic resin is preferably 115° C. or more, more preferably 120° C. or more, still more preferably 125° C. or more, and particularly preferably 130° C. or more. By including a (meth)acrylic resin having a glass transition temperature (Tg) of 115° C. or more as a main component, the protective film is likely to have excellent durability. The upper limit value of Tg of the (meth)acrylic resin is not particularly limited. However, the value is preferably 170° C. or lower in view of forming property and the like.

As the (meth)acrylic resin, any suitable (meth)acrylic resin may be adopted. Examples of the (meth)acrylic resin include poly(meth)acrylates such as methyl polymethacrylate, a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (MS resin, etc.), and a polymer having an alicyclic hydrocarbon group (e.g., a methyl methacrylate-cyclohexyl methacrylate copolymer, a methyl methacrylate-norbornyl (meth)acrylate copolymer). A preferred example includes $C_{1-6}$ alkyl poly (meth)acrylic acid such as polymethyl (meth)acrylate. A more preferred example includes a methyl methacrylate-based resin containing methyl methacrylate as a main component (50 to 100% by weight, preferably 70 to 100% by weight).

Specific examples of the (meth)acrylic resin include ACRYPET VH and ACRYPET VRL20A manufactured by Mitsubishi Rayon Co. and a (meth)acrylic resin with high Tg obtained by intramolecular cross-linking or intramolecular cyclization reaction.

In the present invention, a (meth)acrylic resin having a glutaric anhydride structure, a (meth)acrylic resin having a lactone ring structure, and a (meth)acrylic resin having a glutarimide structure are each preferably used as the (meth)acrylic resin because the resins each have high heat resistance, high transparency, and high mechanical strength.

Examples of the (meth)acrylic resin having a glutaric anhydride structure include (meth)acrylic resins each having a glutaric anhydride structure described in, for example, JP 2006-283013 A, JP 2006-335902 A, and JP 2006-274118 A.

Examples of the (meth)acrylic resin having a lactone ring structure include (meth)acrylic resins each having a lactone ring structure described in, for example, JP 2000-230016 A, JP 2001-151814A, JP 2002-120326A, JP 2002-254544 A, and JP 2005-146084 A.

Examples of the (meth)acrylic resin having a glutarimide structure include (meth)acrylic resins each having a glutarimide structure as described in, for example, JP 2006-309033 A, JP 2006-317560A, JP 2006-328329 A, JP 2006-328334 A, JP 2006-337491 A, JP 2006-337492 A, JP 2006-337493 A, JP 2006-337569 A, and JP 2007-009182 A.

The content of the (meth)acrylic resin in the protective film is preferably 50 to 100% by weight, more preferably 50 to 99% by weight, still more preferably 60 to 98% by weight, and particularly preferably 70 to 97% by weight. When the content of the (meth)acrylic resin in the protective film is less than 50% by weight, high heat resistance and high transparency inherent in the (meth)acrylic resin may not be sufficiently reflected.

The content of the (meth)acrylic resin in the forming material to be used upon forming of the protective film is preferably 50 to 100% by weight, more preferably 50 to 99% by weight, still more preferably 60 to 98% by weight, or particularly preferably 70 to 97% by weight. When the content of the (meth)acrylic resin in the forming material to be used upon forming of the protective film is less than 50% by weight, high heat resistance and high transparency inherent in the (meth)acrylic resin may not be sufficiently reflected.

In addition to the (meth)acrylic resins, the protective film may include other thermoplastic resins. Examples of the other thermoplastic resin include: olefin-based polymers such as polyethylene, polypropylene, an ethylene-propylene copolymer, and poly(4-methyl-1-pentene); halogenagted vinyl-based polymers such as vinyl chloride, vinylidene chloride, and a chlorinated vinyl resin; acrylic polymers such as polymethyl methacrylate; styrene-based polymers such as polystyrene, a styrene-methyl methacrylate copolymer, a styrene-acrylonitrile copolymer, and an acrylonitrile-butadiene-styrene block copolymer; polyesters such as polyethylene terephthalate, polybutylene terephthalate, and polyethylene naphthalate; polyamides such as nylon 6, nylon 66, and nylon 610; polyacetal; polycarbonate; polyphenylene oxide; polyphenylene sulfide; polyether ether ketone; polysulfone; polyether sulfone; polyoxybenzylene; polyamide imide; and rubber polymers such as an ABS resin and an ASA resin blended with polybutadiene-based rubber and acrylic rubber.

The content ratio of the other thermoplastic resin in the protective film is preferably 0 to 50% by weight, more preferably 0 to 40% by weight, still more preferably 0 to 30% by weight, and particularly preferably 0 to 20% by weight.

The protective film may contain an additive. Examples of the additive include hindered phenol-based, phosphorus-based, and sulfur-based antioxidants; stabilizers such as a light stabilizer, a weathering stabilizer, and a heat stabilizer; reinforcing materials such as glass fibers and carbon fibers; UV-absorbing agents such as phenyl salicylate, (2,2'-hydroxy-5-methylphenyl)benzotriazole, and 2-hydroxybenzophenone; a near infrared ray absorbing agent; flame retardants such as tris(dibromopropyl) phosphate, triallyl phosphate, and antimony oxide; antistatic agents such as anionic, cationic, and nonionic surfactants; colorants such as an inorganic pigment, an organic pigment, and a dye; an organic filler and an inorganic filler; a resin modifier; an organic filling agent and an inorganic filling agent; a plasticizer; a lubricant; an antistatic agent; a flame retardant; and a retardation reducing agent.

The content ratio of the additive in the protective film is preferably 0 to 5% by weight, more preferably 0 to 2% by weight, and still more preferably 0 to 0.5% by weight.

Although a method of producing a protective film is not particularly limited, for example, a (meth)acrylic resin and another polymer, additive, or the like are thoroughly mixed by any suitable mixing method to obtain a thermoplastic resin composition previously, and then the composition may be formed into a film. Alternatively, the (meth)acrylic resin and the another polymer, additive, or the like are formed into separate solutions and mixed to obtain a homogenous mixed solution, and then, the solution may be formed into a film.

For producing the thermoplastic resin composition, for example, the film materials are preblended with any suitable mixer such as an omni mixer, and then, the obtained mixture is extruded and kneaded. In this case, the mixer to be used for extrusion and kneading is not particularly limited, and for example, any suitable mixer such as a single screw extruder, a twin screw extruder, a pressure kneader may be used.

Examples of the method of forming a film include any suitable film forming methods such as solution casting, melt extrusion, calendaring, and compression forming. Of those film forming methods, solution casting and melt extrusion are preferred.

Examples of a solvent to be used in the solution casting include aromatic hydrocarbons such as benzene, toluene, and xylene; aliphatic hydrocarbons such as cyclohexane and decalin; esters such as ethyl acetate and butyl acetate; ketons such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethylformamide; and dimethylsulfoxide. These solvents may be used alone or in combination.

Examples of an apparatus for performing the solution casting include a drum-type casting machine, a band-type casting machine, and a spin coater.

Examples of the melt extrusion include a T-die method and an inflation method. The forming temperature is preferably 150 to 350° C. and more preferably 200 to 300° C.

In the case of forming a film by the T-die method, a T-die is attached to a tip end of a known single screw extruder or a twin screw extruder, and a film extruded in a film shape is taken up to obtain a roll-shaped film. At this time, by applying a stretching force in an extrusion direction while appropriately adjusting the temperature of the take-up roll, the film may be also stretched uniaxially. Further, by stretching a film in a direction perpendicular to the extrusion direction, simultaneous biaxial stretching, sequential biaxial stretching, or the like may also be performed.

The protective film may be any of an unstretched film and a stretched film. In the case where the protective film is a stretched film, the film may be any of a uniaxially stretched film and a biaxially stretched film. In the case where the stretched film is the biaxially stretched film, the biaxially stretched film may be any of a simultaneously biaxially stretched film and a sequentially biaxially stretched film. In the case where the film is stretched biaxially, the mechanical strength and film performance are enhanced. When another thermoplastic resin is incorporated into the protective film, a retardation may be prevented from increasing even if the film is stretched, and hence, optical isotropy may be held.

The stretching temperature is preferably in the vicinity of a glass transition temperature of a thermoplastic resin composition that is a film material, and the specific temperature is preferably (glass transition temperature−30° C.) to (glass transition temperature+100° C.) and more preferably (glass transition temperature−20° C.) to (glass transition temperature+80° C.). When the stretching temperature is lower than (glass transition temperature−30° C.), there is a possibility that a sufficient stretching ratio may not be obtained. On the contrary, when the stretching temperature exceeds (glass transition temperature+100° C.), flow of the resin composition occurs, which may prevent stable stretching.

The stretching ratio defined in an area ratio is preferably 1.1 to 25 times and more preferably 1.3 to 10 times. The stretching ratio of less than 1.1 times may not lead to the enhancement of toughness involved in stretching. When the stretching ratio exceeds 25 times, the effect to be obtained by enhancing the stretching ratio may not be recognized.

The stretching speed is preferably 10 to 20,000%/min. and more preferably 100 to 10,000%/min. in one direction. When the stretching speed is less than 10%/min., it takes time to obtain a sufficient stretching ratio and a production cost may be high. When the stretching speed exceeds 20,000%/min., a stretched film may, for example, be broken.

The protective film may be subjected to heat treatment (annealing) or the like after stretching treatment in order to stabilize its optical isotropy and mechanical characteristics. As the conditions of the heat treatment, any suitable conditions may be adopted.

The thickness of the protective film is preferably 5 to 200 μm and more preferably 10 to 100 μm. When the thickness is less than 5 μm, crimping may be increased when the durability test of the polarizing plate is conducted, in addition to the decrease in strength. When the thickness exceeds 200 μm, moisture permeability as well as transparency are degraded, and in the case of using a water-based adhesive, the drying speed of water that is a solvent of the water-based adhesive may be decreased.

The wetting tension of the surface of the protective film is preferably 40 mN/m or more, more preferably 50 mN/m or more, and still more preferably 55 mN/m or more. When the wetting tension of the surface is at least 40 mN/m or more, the adhesion strength between the protective film and the polarizer is further enhanced. In order to adjust the wetting tension of the surface, any suitable surface treatment may be performed. Examples of the surface treatment include corona discharge treatment, plasma treatment, ozone spraying, UV-ray irradiation, flame treatment, and chemical treatment. Of those, corona discharge treatment and plasma treatment are preferably used.

A-5. Other

As the second protective film, any suitable protective film may be adopted. Typical examples of the material forming the second protective film include cellulose-based polymers such as diacetylcellulose and triacetylcellulose. The second protective film may be formed of the same material as that for the protective film described in the above-mentioned item A-4. The adhesive layer provided between the polarizer 11 and the second protective film may be formed of any suitable adhesive. As the adhesive, the adhesive composition described in the above-mentioned item A-2 may be used.

B. Production Method

As a method of producing a polarizing plate of the present invention, any suitable method may be adopted. Hereinafter, one embodiment is described. The polarizer and the protective film are laminated via an easy-adhesion layer. For example, the easy-adhesion layer is previously formed on one side of the protective film. The easy-adhesion layer is formed typically by applying the easy-adhesive composition to one side of the protective film, followed by drying. As a method of applying the easy-adhesive composition, any suitable method may be adopted. Examples of the method include bar coating, roll coating, gravure coating, rod coating, slot orifice coating, curtain coating, and fountain coating. The drying temperature is typically 50° C. or more, preferably 90° C. or more, and more preferably 110° C. or more. By setting the drying temperature in such range, a polarizing plate excellent in color fastness (particularly, under high-temperature and high-humidity conditions) may be provided. The drying temperature is preferably 200° C. or less and more preferably 180° C. or less.

As described above, at least one side (the side on which the polarizer is placed) of the protective film may be subjected to surface treatment. In this case, before the easy-adhesion layer is formed, surface treatment is performed. The specific example of the surface treatment is as described in the above-mentioned item A-4. The surface treatment is preferably corona discharge treatment or plasma treatment. By subjecting the protective film to the corona discharge treatment, the adhesion property and adherence between the polarizer and the protective film may be further enhanced. The corona discharge treatment is performed under any suitable conditions. For example, the corona discharge electron irradiation amount is preferably 50 to 150 W/m/min. and more preferably 70 to 100 W/m/min.

The polarizer and the protective film are laminated via an adhesive layer. Specifically, a method involving applying the adhesive composition to one side of any one of the polarizer and the protective film, and then attaching the polarizer and the protective film to each other, followed by drying, is exemplified. Examples of a method of applying an adhesive composition include a roll method, a spray method, and a soaking method. Further, in the case where the adhesive composition contains a metal compound colloid, the adhesive composition is applied so that the thickness of the adhesive composition after being dried becomes larger than an average particle diameter of the metal compound colloid. The drying temperature is typically 5 to 150° C. and preferably 30 to 120° C. The drying time is typically 120 seconds or more and preferably 300 seconds or more.

C. Image Display Device

The image display device of the present invention includes the polarizing plate of the present invention. Specific examples of the image display device include self-emitting type display devices such as an electroluminescence (EL) display, a plasma display (PD), and a field emission display (FED), and a liquid crystal display device. The liquid crystal display device includes a liquid crystal cell and the polarizing plate placed on at least one side of the liquid crystal cell.

EXAMPLES

Hereinafter, the present invention is specifically described by way of examples, but the present invention is not limited by the examples. It should be noted that the evaluation method for the protective film was performed as follows.
<Optical Properties>

An in-plane retardation And a thickness direction retardation Rth were measured using KOBRA-WPR produced by Oji Scientific Instruments Co., Ltd. A visible light transmittance (total light transmittance) was measured using NDH-1001DP produced by Nippon Denshoku Industries Co., Ltd.

Example 1

(Production of Polarizer)

A polyvinyl alcohol film with a thickness of 75 μm was soaked in hot water at 28° C. for 60 seconds to be swollen. Next, the polyvinyl alcohol film was soaked in an aqueous solution containing iodine and potassium iodide (weight ratio 1:10) and dyed so as to obtain a predetermined single axis transmittance while being stretched by 3.3 times. Then, the resultant polyvinyl alcohol film was soaked in an aqueous solution containing 3% by weight of boric acid and 2% by weight of potassium iodide for 10 seconds and stretched in an aqueous solution containing 4% by weight of boric acid and 3% by weight of potassium iodide at 60° C. so that the stretching ratio became 6.0 times in total. Then, the obtained stretched film was soaked in an aqueous solution containing 5% by weight of potassium iodide for 10 seconds and dried in an oven at 40° C. for 3 minutes to obtain a polarizer with a thickness of 30 μm.

(Production of Protective Film)

A pellet [a mixture (Tg 127° C.) of 90 parts by weight of (meth)acrylic resin having a lactone ring structure in which $R^1$ is a hydrogen atom and $R^2$ and $R^3$ are methyl groups in the following general formula (1) {copolymerization monomer weight ratio=methyl methacrylate/2-(hydroxymethyl) methyl acrylate=8/2, lactone ring formation rate: about 100%, content ratio of the lactone ring structure: 19.4%, weight average molecular weight: 133,000, melt flow rate: 6.5 g/10 min. (240° C., 10 kgf), Tg 131° C.} and 10 parts by weight of acrylonitryl-styrene (AS) resin {Toyo-AS AS 20 produced by Toyo Styrene Co., Ltd.} was supplied to a biaxial extruder and melt-extruded in a sheet shape at about 280° C. to obtain a (meth)acrylic resin sheet having a lactone ring structure with a thickness of 110 μm. The unstretched sheet was stretched longitudinally by 2.0 times and laterally by 2.4 times under a temperature condition of 160° C. to obtain a protective film (thickness: 40 μm, an in-plane retardation And: 0.8 nm, a thickness direction retardation Rth: 1.5 nm).

[Chem 1]

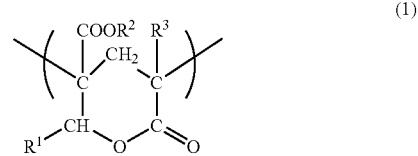

(1)

(Corona Discharge Treatment)

One side of the protective film obtained as described above was subjected to corona discharge treatment (corona discharge electron irradiation amount: 77 W/m²/min.).

(Formation of Easy-Adhesion Layer)

20 grams of a cross-linking agent (EPOCROS WS700 (trade name) produced by Nippon Shokubai Co., Ltd, solid content: 25%) were added to 100 g of aqueous urethane resin (Super Flex 210 (trade name) produced by DAI-ICHI KOGYO SEIYAKU CO., LTD., solid content: 33%) having a carboxyl group, and the mixture was stirred for 3 minutes to obtain an easy-adhesive composition.

The obtained easy-adhesive composition was applied to a corona discharge treated surface of a protective film that had been subjected to corona discharge treatment with a bar coater (#6). After that, the protective film was placed in a hot air drier (140° C.) and the urethane composition was dried for about 5 minutes to form an easy-adhesion layer (0.2 to 0.4 µm).

(Second Protective Film)

A triacetylcellulose film with a thickness of 40 µm was soaked in a 10% sodium hydroxide aqueous solution (60° C.) for 30 seconds to be saponified and washed with water for 60 seconds to obtain a second protective film.

(Preparation of Adhesive Composition)

20 parts by weight of methylol melamine were dissolved in pure water under a temperature condition of 30° C. with respect to 100 parts by weight of acetoacetyl group-containing polyvinyl alcohol-based resin (average polymerization degree: 1200, sponification degree: 98.5 mol %, acetoacetyl group modification degree: 5 mol %) to obtain an aqueous solution with a solid content of 0.5%. The obtained aqueous solution was used as an adhesive composition under a temperature condition of 30° C.

(Production of Polarizing Plate)

After 30 minutes from the preparation of the adhesive composition, the adhesive composition was applied to the easy-adhesion layer side of the protective film with the easy-adhesion layer formed thereon so that the thickness of the adhesive composition after being dried became 50 nm. Similarly, the adhesive composition was applied to one side of the second protective film. After that, the protective film and the second protective film were each laminated on both sides of the polarizer via the adhesive composition, and the laminate thus obtained was placed in a hot air drier (70° C.), followed by drying for 5 minutes, to obtain a polarizing plate.

Example 2

A polarizing plate was produced in the same way as in Example 1, except that the drying temperature was set at 120° C. during the formation of an easy-adhesion layer.

Example 3

A polarizing plate was produced in the same way as in Example 1, except that the drying temperature was set at 100° C. during the formation of an easy-adhesion layer.

Example 4

A polarizing plate was produced in the same way as in Example 1, except that the drying temperature was set at 80° C. during the formation of an easy-adhesion layer.

Example 5

A polarizing plate was produced in the same way as in Example 1, except that the drying temperature was set at 60° C. during the formation of an easy-adhesion layer.

Comparative Example 1

A polarizing plate was produced in the same way as in Example 1, except that an aqueous propylene resin (TP608B (trade name) produced by UMG ABS Ltd., solid content: 37.2%) having no reactive group was used instead of aqueous urethane resin having a carboxyl group during the preparation of an easy-adhesive composition forming an easy-adhesion layer.

Comparative Example 2

A polarizing plate was produced in the same way as in Example 1, except that an aqueous propylene resin (TP003P (trade name) produced by UMG ABS Ltd., solid content: 40.3%) having no reactive group was used instead of aqueous urethane resin having a carboxyl group during the preparation of an easy-adhesive composition forming an easy-adhesion layer.

Comparative Example 3

A polarizing plate was produced in the same way as in Example 1, except that an aqueous propylene resin (TP601B (trade name) produced by UMG ABS Ltd., solid content: 37.3%) having no reactive group was used instead of aqueous urethane resin having a carboxyl group during the preparation of an easy-adhesive composition forming an easy-adhesion layer.

Comparative Example 4

A polarizing plate was produced in the same way as in Example 1, except that an aqueous modified propylene resin (TP006M (trade name) produced by UMG ABS Ltd., solid content: 29.7%) having no reactive group was used instead of aqueous urethane resin having a carboxyl group during the preparation of an easy-adhesive composition forming an easy-adhesion layer.

Comparative Example 5

A polarizing plate was produced in the same way as in Example 1, except that an aqueous ethylene resin (TE502P (trade name) produced by UMG ABS Ltd., solid content: 38.1%) having no reactive group was used instead of aqueous urethane resin having a carboxyl group during the preparation of an easy-adhesive composition forming an easy-adhesion layer.

Comparative Example 6

A polarizing plate was produced in the same way as in Example 1, except that an aqueous styrene resin (TS101E (trade name) produced by UMG ABS Ltd., solid content: 40.9%) having no reactive group was used instead of aqueous urethane resin having a carboxyl group during the preparation of an easy-adhesive composition forming an easy-adhesion layer.

Comparative Example 7

A polarizing plate was produced in the same way as in Example 1, except that an aqueous urethane resin (WS4000 (trade name) produced by Mitsui Chemicals Polyurethane, Inc., solid content: 29.5%) having a siloxane group was used instead of aqueous urethane resin having a carboxyl group during the preparation of an easy-adhesive composition forming an easy-adhesion layer.

Comparative Example 8

A polarizing plate was produced in the same way as in Example 1, except that an aqueous urethane resin (W6010 (trade name) produced by Mitsui Chemicals Polyurethane, Inc., solid content: 30%) having no reactive group was used instead of aqueous urethane resin having a carboxyl group during the preparation of an easy-adhesive composition forming an easy-adhesion layer.

Comparative Example 9

A polarizing plate was produced in the same way as in Example 1, except that a cross-linking agent was not added during the preparation of an easy-adhesive composition forming an easy-adhesion layer.

The adherence between the protective film and the easy-adhesion layer in each example and each comparative example was evaluated. The evaluation method is as follows, and Table 1 shows evaluation results.

(Method of Evaluating Adherence Between Protective Film and Easy-Adhesion Layer)

The easy-adhesive composition used in each example and each comparative example was applied to the surface of the protective film obtained as described above with a bar coater so that the thickness of the easy-adhesive composition after being dried became 300 nm and dried in an oven to form an easy-adhesion layer on the surface of the protective film. Thus, a test sample was obtained.

Regarding the adherence between the protective film and the easy-adhesion layer of the obtained test sample, a cross-cut adhesion test was conducted pursuant to JIS K5400 3.5. Specifically, the easy-adhesion layer surface of the test sample was cut in a cross-cut shape of 1 mm per side with a sharp blade, and a cellophane-tape (24 mm in width, JIS Z1522) was attached to the cross-cut portion with a wooden spatula. After that, the cellophane-tape was peeled, and the number of squares that did not adhere to the adhesive tape was counted among 100 cross-cut squares. More specifically, the case where the easy-adhesion layer was not peeled at all is shown as 100/100 and the case where the entire easy-adhesion layer was peeled is shown as 0/100.

TABLE 1

|  | Adherence |
|---|---|
| Example 1 | 100/100 |
| Example 2 | 100/100 |
| Example 3 | 100/100 |
| Example 4 | 100/100 |
| Example 5 | 100/100 |
| Comparative Example 1 | 0/100 |
| Comparative Example 2 | 0/100 |
| Comparative Example 3 | 50/100 |
| Comparative Example 4 | 0/100 |
| Comparative Example 5 | 0/100 |
| Comparative Example 6 | 80/100 |
| Comparative Example 7 | 100/100 |
| Comparative Example 8 | 100/100 |
| Comparative Example 9 | 100/100 |

As is apparent from Table 1, Examples 1 to 5 and Comparative Examples 7 to 9 were excellent in adherence, whereas Comparative Examples 1 to 6 were poor in adherence. It may be said from this result that the excellent adherence to the protective film is obtained by forming an easy-adhesion layer of urethane resin.

Regarding the polarizing plates obtained in Examples 1 to 5 and Comparative Examples 7 to 9, the following evaluations were made. Table 2 shows the evaluation results.

1. Adhesion Property Between the Polarizer and the Protective Film

A sample chip with a size of 5 cm×5 cm was cut out from the polarizing plate obtained as described above. The surface of the protective film was subjected to pressure-sensitive adhesive treatment, and the polarizing plate was attached to a glass plate. After that, one corner portion of the polarizing plate was pinched, and the polarizing plate was peeled in a diagonal direction at a speed of 1 mm/sec. The peeled position was observed. In this case, the polarizing plate was peeled while the corner portion thereof being 90° with respect to the glass plate. The evaluation standard is as follows.

○: The polarizing plate was peeled at an interface between the pressure-sensitive adhesive and the glass plate ×: The polarizing plate was peeled at an interface between the polarizer and the protective film 2. Water Resistance (Adherence)

A sample chip in a rectangular shape with a size of 25 mm×50 mm was cut out from the polarizing plate obtained as described above and soaked in hot water at 60° C. for 5 hours. After that, the presence/absence of peeling at the interface between the polarizer and the protective film was observed. The criterion is as follows.

◎: No peeling was observed.

○: Peeling was observed partially.

×: Peeling was observed entirely.

3. Moisture Resistance 1 (Adherence)

A sample chip in a rectangular shape with a size of 25 mm×50 mm was cut out from the polarizing plate obtained as described above, placed in a constant-temperature and constant-humidity device at a temperature of 60° C. and a humidity of 90% $R^H$ and left stand for 500 hours. After that, the presence/absence of peeling at the interface between the polarizer and the protective film was observed visually. The criterion is as follows.

◎: No peeling was observed.

○: Peeling was observed partially.

×: Peeling was observed entirely.

4. Moisture Resistance 2 (Color Fastness)

A sample chip in a rectangular shape with a size of 25 mm×50 mm was cut out from the polarizing plate obtained as described above, placed in a constant-temperature and constant-humidity device at a temperature of 60° C. and a humidity of 90% RH and left stand for 500 hours. After that, the discoloration state was observed visually. The criterion is as follows.

◎: No discoloration was observed.

○: Discoloration was observed slightly.

×: Discoloration was observed entirely.

5. Heat Resistance (Adherence and Color Fastness)

A sample chip in a rectangular shape with a size of 25 mm×50 mm was cut out from the polarizing plate obtained as described above, placed in a constant-temperature device at 60° C. and left stand for 500 hours. After that, the discoloration and the peeling state at the interface between the polarizer and the protective film were observed visually. The criterion is as follows.

◎: No peeling and no discoloration were observed.

○: Peeling was observed slightly and discoloration was observed slightly.

×: Peeling and discoloration were observed entirely.

TABLE 2

| | Adherence | Water resistance (Adherence) | Moisture resistance 1 (Adherence) | Moisture resistance 2 (Color fastness) | Heat resistance (Adherence · Color fastness) |
|---|---|---|---|---|---|
| Example 1 | ○ | ◎ | ◎ | ◎ | ◎ |
| Example 2 | ○ | ◎ | ◎ | ◎ | ◎ |
| Example 3 | ○ | ◎ | ◎ | ○ | ◎ |
| Example 4 | ○ | ◎ | ◎ | X | ◎ |
| Example 5 | ○ | ◎ | ◎ | X | ◎ |
| Comparative Example 7 | ○ | X | X | — | X |
| Comparative Example 8 | ○ | X | X | — | X |
| Comparative Example 9 | ○ | ○ | X | — | ◎ |

As is apparent from Table 2, Examples 1 to 5 and Comparative Example 9 were substantially excellent in water resistance, whereas Comparative Examples 7 and 8 were poor in water resistance. Examples 1 to 5 were excellent in moisture resistance, whereas Comparative Examples 7 to 9 were poor in moisture resistance. It is true from those results that a polarizing plate excellent in water resistance and moisture resistance may be obtained by forming an easy-adhesion layer of an easy-adhesive composition containing urethane resin having a carboxyl group and a cross-linking agent. Further, Examples 1 to 5 and Comparative Example 9 were excellent in heat resistance, whereas Comparative Examples 7 and 8 were poor in heat resistance. It is true from this result that a polarizing plate which is also excellent in heat resistance may be obtained by using urethane resin having a carboxyl group.

Examples 1 and 2 were also very excellent in moisture resistance (colorfastness), and discoloration was observed slightly in Example 3. On the other hand, discoloration was observed in Examples 4 and 5. It is true from those results that a polarizing plate which is also excellent in color fastness may be obtained by setting the drying temperature during the formation of an easy-adhesion layer at 90° C. or more. It should be noted that, in Example 3 (drying temperature: 100° C.), Example 4 (drying temperature: 80° C.), and Example 5 (drying temperature: 60° C.), discoloration was observed. However, when the drying time during the formation of an easy-adhesion layer was set at 2 hours, a polarizing plate excellent in color fastness was obtained even when the drying temperature during the formation of an easy-adhesion layer was 100° C. and 80° C. It is true from this result that a polarizing plate excellent in adherence and color fastness is obtained in a short period of time by setting the drying temperature during the formation of an easy-adhesion layer at 110° C. or more.

INDUSTRIAL APPLICABILITY

The polarizing plate of the present invention may be suitably used for an image display device such as a liquid crystal display device and a self-emitting type display device.

DESCRIPTION OF SYMBOLS

| | |
|---|---|
| 10 | polarizing plate |
| 11 | polarizer |
| 12 | adhesive layer |
| 13 | easy-adhesion layer |
| 14 | protective film |

The invention claimed is:

1. A polarizing plate, comprising:
   a polarizer;
   an adhesive layer;
   an easy-adhesion layer formed of an easy-adhesive composition containing a urethane resin having a carboxyl group and a cross-linking agent; and
   a protective film containing a (meth)acrylic resin, in the stated order.

2. The polarizing plate according to claim 1, wherein the adhesive layer is formed of an adhesive composition containing a polyvinyl alcohol resin having an acetoacetyl group.

3. The polarizing plate according to claim 1 or 2, wherein the easy-adhesion layer is obtained by subjecting the easy-adhesive composition to drying at 90° C. or more.

4. The polarizing plate according to claim 3, wherein the protective film is subjected to corona discharge treatment or plasma treatment on a side on which the polarizer is placed.

5. The polarizing plate according to claim 4, wherein the cross-linking agent comprises an acrylic polymer having an oxazoline group.

6. An image display device, comprising the polarizing plate according to claim 5.

7. A liquid crystal display device, comprising:
   a liquid crystal cell; and
   the polarizing plate according to claim 5 placed on at least one side of the liquid crystal cell.

* * * * *